US010708860B2

(12) United States Patent
Perahia et al.

(10) Patent No.: US 10,708,860 B2
(45) Date of Patent: Jul. 7, 2020

(54) WAKE UP SIGNALING IN 802.11 DFS CHANNELS

(71) Applicant: Hewlett Packard Enterprise Development LP, Houston, TX (US)

(72) Inventors: Eldad Perahia, Park City, UT (US); Eric Johnson, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/120,017

(22) Filed: Aug. 31, 2018

(65) Prior Publication Data
US 2020/0077335 A1     Mar. 5, 2020

(51) Int. Cl.
*H04B 7/00* (2006.01)
*H04W 52/02* (2009.01)
*H04W 4/80* (2018.01)
*H04W 84/12* (2009.01)

(52) U.S. Cl.
CPC ......... *H04W 52/0216* (2013.01); *H04W 4/80* (2018.02); *H04W 52/0229* (2013.01); *H04W 52/0274* (2013.01); *H04W 84/12* (2013.01)

(58) Field of Classification Search
CPC ......... H04W 52/0209; H04W 52/0212; H04W 52/0222; H04W 52/0274; H04W 52/028
USPC .......................................... 370/310, 311, 349
See application file for complete search history.

(56) References Cited

U.S. PATENT DOCUMENTS

| | | | | |
|---|---|---|---|---|
| 8,805,420 B2* | 8/2014 | Kenney | ................. | H04W 48/16 455/456.1 |
| 9,338,787 B2* | 5/2016 | Gloss | .................... | H04W 24/08 |
| 9,801,060 B2* | 10/2017 | Min | ...................... | H04W 12/06 |
| 10,015,745 B2* | 7/2018 | Azizi | .................... | H04L 5/0053 |
| 10,237,826 B2* | 3/2019 | Azizi | ............... | H04W 52/0235 |
| 10,368,247 B2* | 7/2019 | Ngo | ..................... | H04W 16/14 |
| 2001/0015745 A1 | 8/2001 | Onishi et al. | | |

(Continued)

OTHER PUBLICATIONS

Hong, H. et al., A Low-Power WLAN Communication Scheme for IoT WLAN Devices using Wake-up Receivers, (Research Paper), Jan. 7, 2018, 16 Pgs.

(Continued)

*Primary Examiner* — Dmitry Levitan
(74) *Attorney, Agent, or Firm* — Sheppard Mullin Richter & Hampton LLP

(57) ABSTRACT

Systems and methods for wake up signaling in 802.11 DFS channels include enabling a primary connectivity radio of a device responsive to a wake up radio of the device receiving a composite radio signal transmitted by an access point in an 802.11 Dynamic Frequency Selection (DFS) channel, the composite radio signal comprising a wake up radio signal and a time-continuous signal, the time-continuous signal being substantially adjacent in frequency, but not necessarily contiguous in frequency, to the wake up radio signal; and exchanging data with the access point through the primary connectivity radio after the primary connectivity radio is enabled. The wake up radio signal may be an IEEE 802.11ba signal disposed in a center frequency band of a IEEE 802.11ax Physical Layer Convergence Protocol (PLCP) Protocol Data Unit (PPDU). The time-continuous signal may be real or emulated data traffic disposed in at least one IEEE 802.11ax resource unit.

17 Claims, 10 Drawing Sheets

(56) References Cited

U.S. PATENT DOCUMENTS

| | | | |
|---|---|---|---|
| 2014/0003237 A1* | 1/2014 | Kenney | H04W 28/10 |
| | | | 370/235 |
| 2017/0332327 A1* | 11/2017 | Fang | H04L 5/0007 |
| 2018/0020410 A1* | 1/2018 | Park | H04W 52/0235 |
| 2018/0091344 A1 | 3/2018 | Azizi et al. | |
| 2018/0183905 A1* | 6/2018 | Azizi | H04L 27/2613 |
| 2018/0184379 A1* | 6/2018 | Liu | H04L 27/10 |
| 2018/0249413 A1* | 8/2018 | Sun | H04W 52/0229 |
| 2018/0255514 A1* | 9/2018 | Sun | H04W 52/0229 |
| 2018/0376419 A1* | 12/2018 | Li | H04W 52/0222 |
| 2019/0223101 A1* | 7/2019 | Li | H04W 8/005 |
| 2019/0320389 A1* | 10/2019 | Alanen | H04L 5/0064 |
| 2020/0053648 A1* | 2/2020 | Guo | H04W 52/28 |

OTHER PUBLICATIONS

IEEE P802.11ba/D3.0, May 2019, 182 pages.
Stephens, Adrian P., "IEEE Standard 802.11-2012", Sep. 19, 2016, 2 pages.

\* cited by examiner

(54)  WAKE UP SIGNALING IN 802.11 DFS CHANNELS

DESCRIPTION OF RELATED ART

The explosion and proliferation of wireless-networked electronic devices in everything from inventory tags to appliances has led to increasing demand for small battery-powered devices with low power consumption and consequent long battery life. These devices, often referred to collectively as the "Internet of Things" (IoT), currently employ simple low-power network protocols such as Bluetooth Low Energy (BLE), Zigbee, and the like. But for a variety of reasons designers would like to use WiFi instead. Up to now the primary drawback with WiFi has been relatively higher power consumption, leading to shorter battery life for IoT devices. The primary driver of this higher power consumption is the need for the Wi-Fi radio to be active constantly to listen for WiFi management frames. For low duty cycle applications like asset tracking, this type of overhead dramatically reduces battery standby time.

One possible solution offered by the IEEE 802.11 standard is the Target Wake Time (TWT) feature, which enables IoT devices to turn off their WiFi radios when not exchanging data, significantly reducing the drain on batteries. But the use of TWT has the potential to cause long delays when an unscheduled query of an IoT device is required. For example, consider a sensor with scheduled reporting once each hour. If the IoT device is not responsive during the hour, a request for additional reporting or to change the configuration of the device could be delayed up to an hour.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

To reduce WiFi power consumption the new IEEE 802.11ba amendment proposes adding a second low-cost, ultra-low power receive-only radio, referred to as the wake up radio (WUR), alongside the main WiFi radio, referred to as the primary connectivity radio (PCR). The wake up radio is enabled while the primary connectivity radio is disabled. On receiving a wake up radio signal (WURS) from an access point (AP) the wake up radio wakes the primary connectivity radio so that normal IEEE 802.11 communication can take place between the access point and the device. This solution enables ultra-low power WiFi operation with very low latency.

Unfortunately the WURS specified by the amendment closely resembles a radar signal and so may trigger dynamic frequency selection (DFS) in DFS channels. When this happens WiFi radios are required by law to vacate the affected DFS channel for a significant interval, currently set at 30 minutes. For this reason the IEEE 802.11ba standard does not allow the use of the WURS in DFS channels. But the use of DFS channels is highly desirable to minimize interference between access points, especially in large deployments such as large enterprises, warehouses, and in outdoor applications such as in stadiums and the like.

Implementations of the disclosed technology may include systems and methods that enable the use of the WURS in DFS channels. These systems and methods may place one or more time-continuous signals substantially adjacent in frequency to the WURS, but not necessarily contiguous in frequency to the WURS. For example, the time-continuous signals may be placed before the WURS, after the WURS, or both. The resulting signal does not resemble a radar signal, and so may be used to implement the WURS in DFS channels. Other implementations may employ other chirp signals and other time-continuous signals in other wireless communications technologies, for example in cellular, LTE, and the like.

Figure 1:
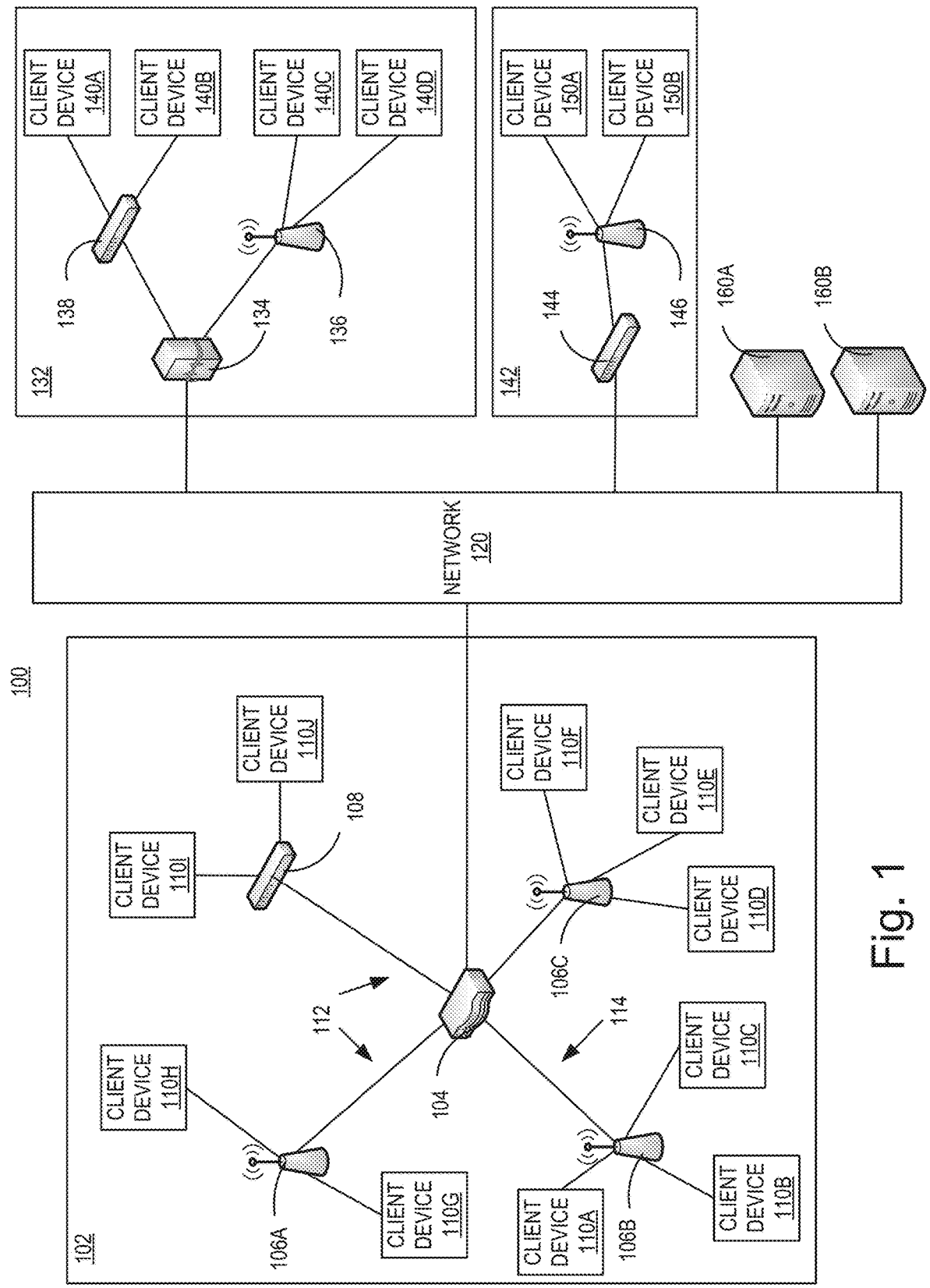
FIG. 1 illustrates one example of a network configuration that may be implemented for an organization, such as a business, educational institution, governmental entity, healthcare facility or other organization.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
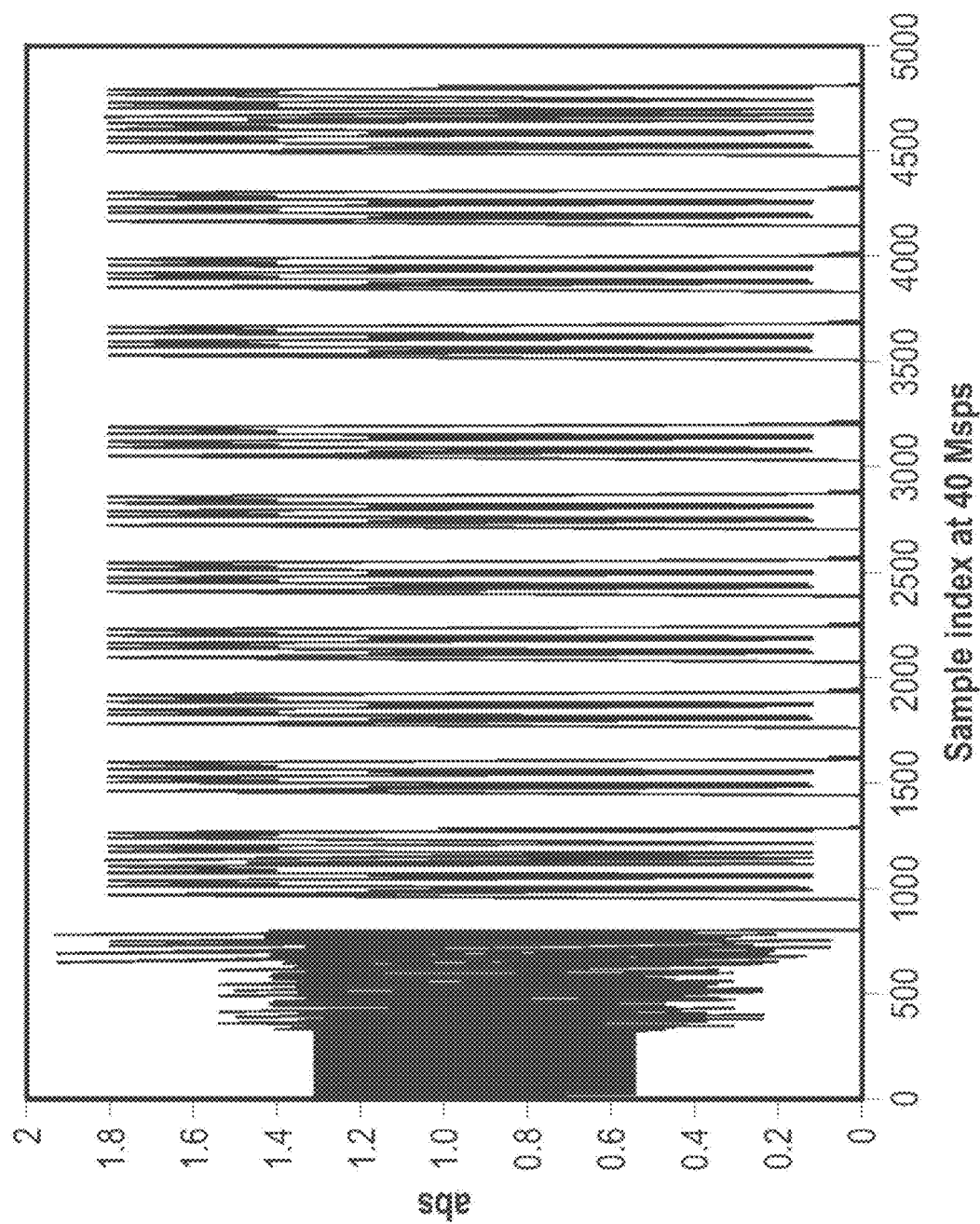
FIG. 2 depicts the first 125 microseconds of a wake up radio signal according to the IEEE 802.11ba standard.

FIG. 2 depicts the first 125 microseconds of the WURS according to the IEEE 802.11ba standard. The waveform used for the WURS occupies a narrow bandwidth of only 4 MHz, and is produced by a very simple On-Off-Keying (OOK) modulation that turns on or off every 4 or 8 microseconds. (abs=absolute value) Therefore the WURS closely resembles a radar signal. Simulations have shown that current IEEE 802.11 devices would experience a 100% probability of false radar detection in the presence of this WURS.

Figure 3:
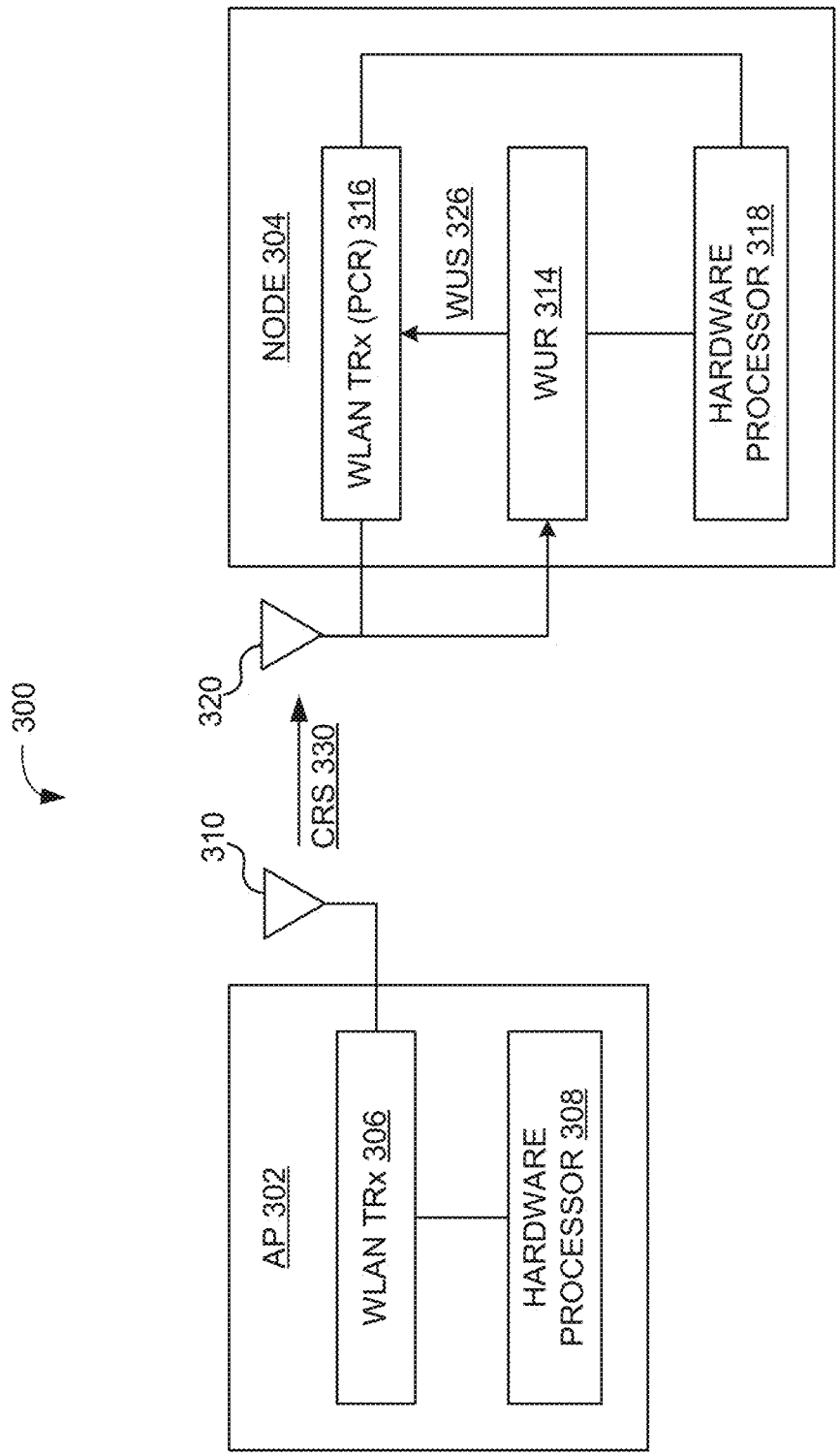
FIG. 3 depicts a communications system in accordance with one embodiment.

FIG. 3 depicts a communications system 300 in accordance with one embodiment. In the example implementation of FIG. 3, the communications system 300 includes an access point (AP) 302 and a node 304. The AP 302 may be any device capable of executing the functions required of an access point. For example, the AP 302 may be implemented as an off-the-shelf device, as a smartphone acting as a hotspot, as a dedicated hotspot device, and the like.

The AP 302 includes a wireless local-area network (WLAN) transceiver (TRx) 306 and one or more antennas 310. The WLAN TRx 306 may be an IEEE 802.11ax transceiver. The AP 302 may include a hardware processor 308 and associated hardware to perform functions described herein for the AP 302.

The node 304 includes a WLAN transceiver TRx 316, a Wake Up Radio (WUR) 314, and one or more antennas 320. The WLAN TRx 316 may be an IEEE 802.11ax Primary Connectivity Radio (PCR). The WUR 314 may conform to IEEE 802.11ba. The node 304 may include a hardware processor 318 and associated hardware to perform functions described herein for the node 304.

Figure 4A:
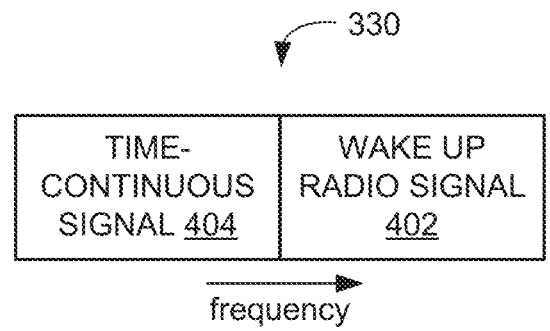
FIGS. 4A, 4B, and 4C show spectral plans for a composite radio signal according to various embodiments.
Figure 4B:
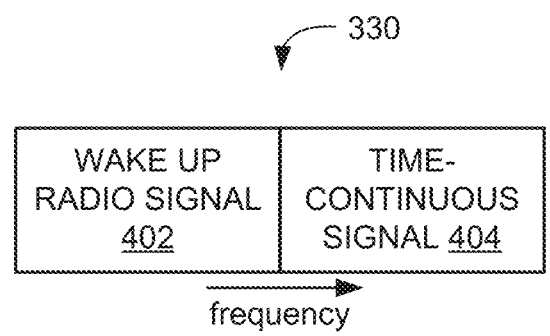
Figure 4C:
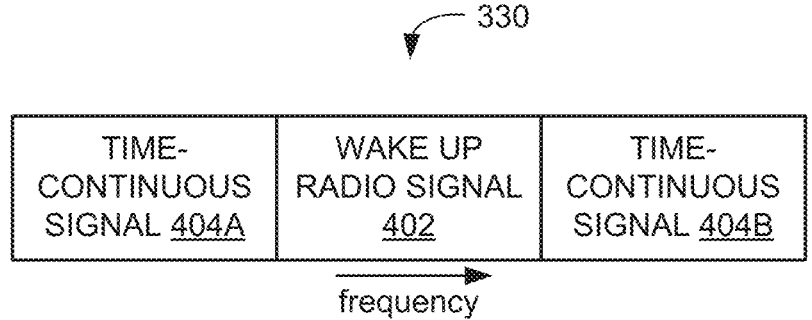

In operation, AP 302 generates a composite radio signal 330 and transmits the composite radio signal 330 to one or more nodes 304. FIGS. 4A, 4B, and 4C show spectral plans for the composite radio signal 330 according to various embodiments. Referring to FIGS. 4A, 4B, and 4C, each composite radio signal 330 includes a wake up radio signal 402 and one or more time-continuous signals 404 that are substantially adjacent in frequency, but not necessarily contiguous in frequency, to the wake up radio signal 402. In some embodiments each time-continuous signal 404 is within approximately 10 MHz of the corresponding wake up radio signal 402, depending upon the implementation of the radar detector in the access point 302.

In the embodiment of FIG. 4A, the composite radio signal 330 includes one time-continuous signal 404 at a lower frequency than the wake up radio signal 402. In the embodiment of FIG. 4B, the composite radio signal 330 includes one time-continuous signal 404 at a higher frequency than the wake up radio signal 402. In the embodiment of FIG. 4C, the composite radio signal 330 includes two time-continuous signals 404A and 404B, with time-continuous signal 404A at a lower frequency than the wake up radio signal 402, and with time-continuous signal 404B at a higher frequency than the wake up radio signal 402.

The composite radio signal 330 may be a unicast packet or a multicast frame. The composite radio signal 330 is described herein for a 20 MHz IEEE 802.11ax Physical Layer Convergence Protocol (PLCP) Protocol Data Unit (PPDU). However, the described technology also applies to 40 MHz, 80 MHz, and 160 MHz IEEE 802.11ax PPDUs.

Figure 5:
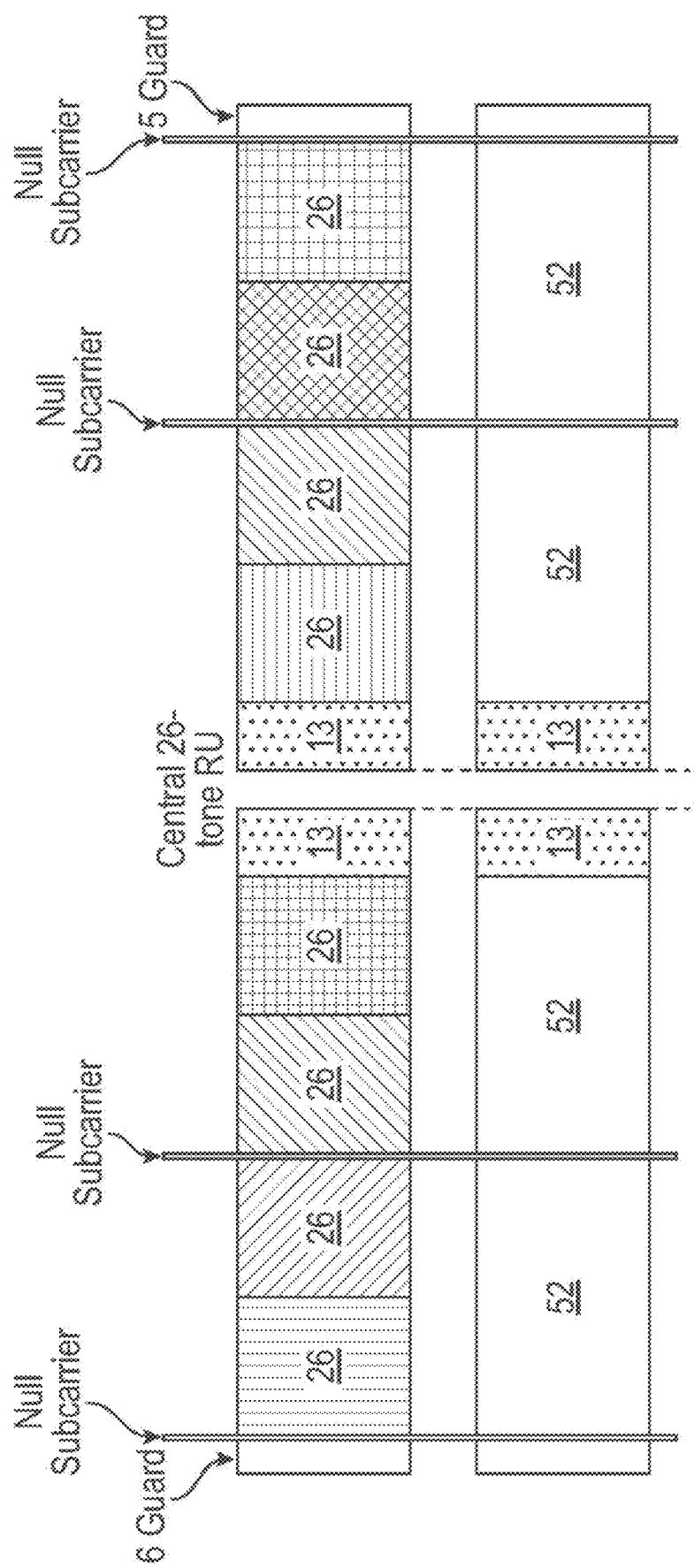
FIG. 5 shows the spectral plan for nine-user and five-user 20 MHz IEEE 802.11ax PPDUs.

FIG. 5 shows the existing spectral plan for nine-user and five-user 20 MHz IEEE 802.11ax PPDUs. Referring to FIG. 5, the OFDMA data field of the nine-user PPDU includes nine 26-tone resource units (RUs). The OFDMA data field of the five-user PPDU includes four 52-tone RUs and one 26-tone RU.

Figure 6:
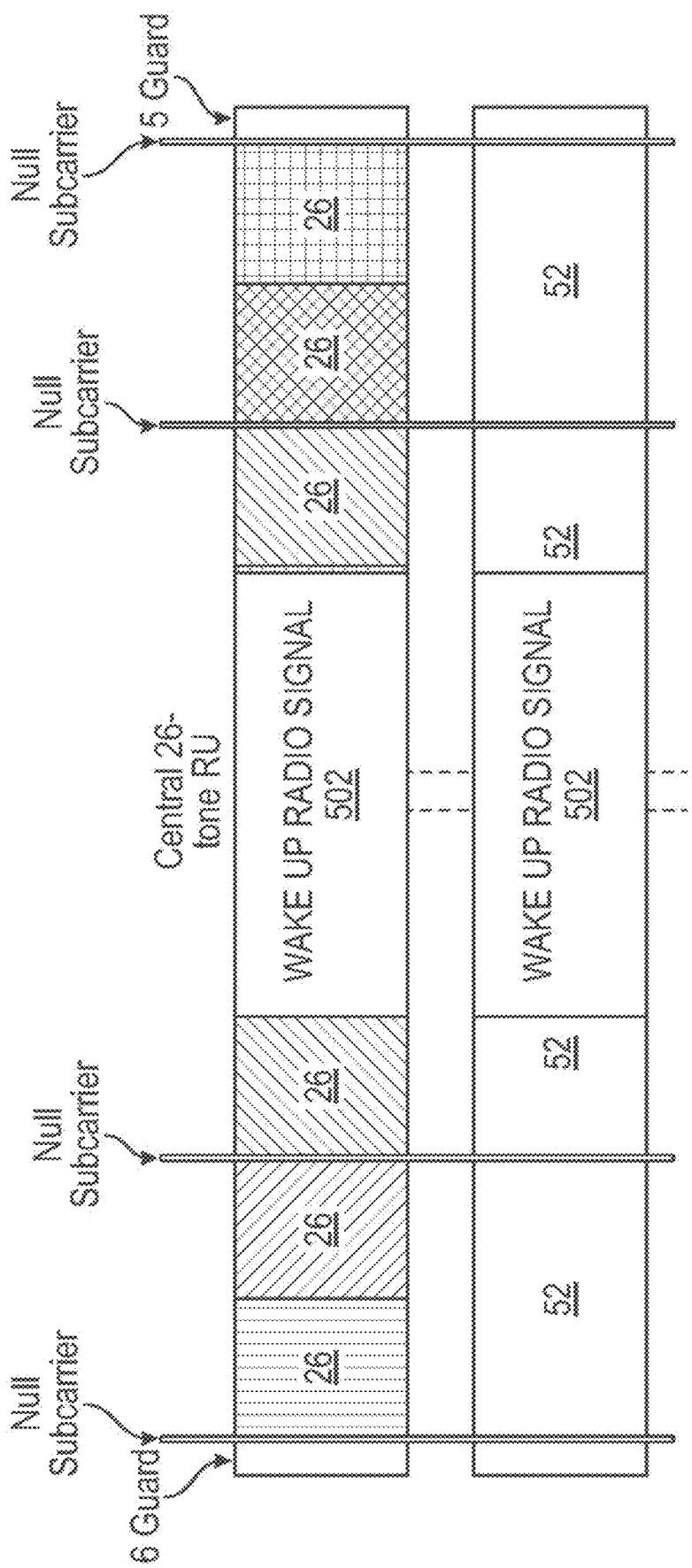
FIG. 6 shows a spectral plan for a composite radio signal for nine-user and five-user 20 MHz IEEE 802.11ax PPDUs according to various embodiments.

FIG. 6 shows the spectral plan for the composite radio signal 330 for nine-user and five-user 20 MHz IEEE 802.11ax PPDUs according to various embodiments. Referring to FIG. 6, the IEEE 802.11ba wake up radio signal is placed in the center 4 MHz of RUs of the 802.11ax OFDMA data field. In the nine-user 20 MHz IEEE 802.11ax PPDU the wake up radio signal 502 occupies the center three of the five 26-tone RUs. In the five-user 20 MHz IEEE 802.11ax PPDU the wake up radio signal 502 occupies the center 26-tone RU and portions of the two adjacent 52-tone RUs. In DFS channels this placement requires the AP 302 to populate some or all of the adjacent RUs with real or emulated 802.11ax traffic. Once the RUs are populated the PPDUs are as shown in FIG. 6.

While various embodiments are described herein in terms of nine-user and five-user PPDUs, it will be appreciated that other PPDUs may be employed. For example, any of the 52-tone RUs may be replaced with two 26-tone RUs. Accordingly, some embodiments employ six-user, seven-user, or eight-user PPDUs. The use of other PPDUs is contemplated as well.

Figure 7:
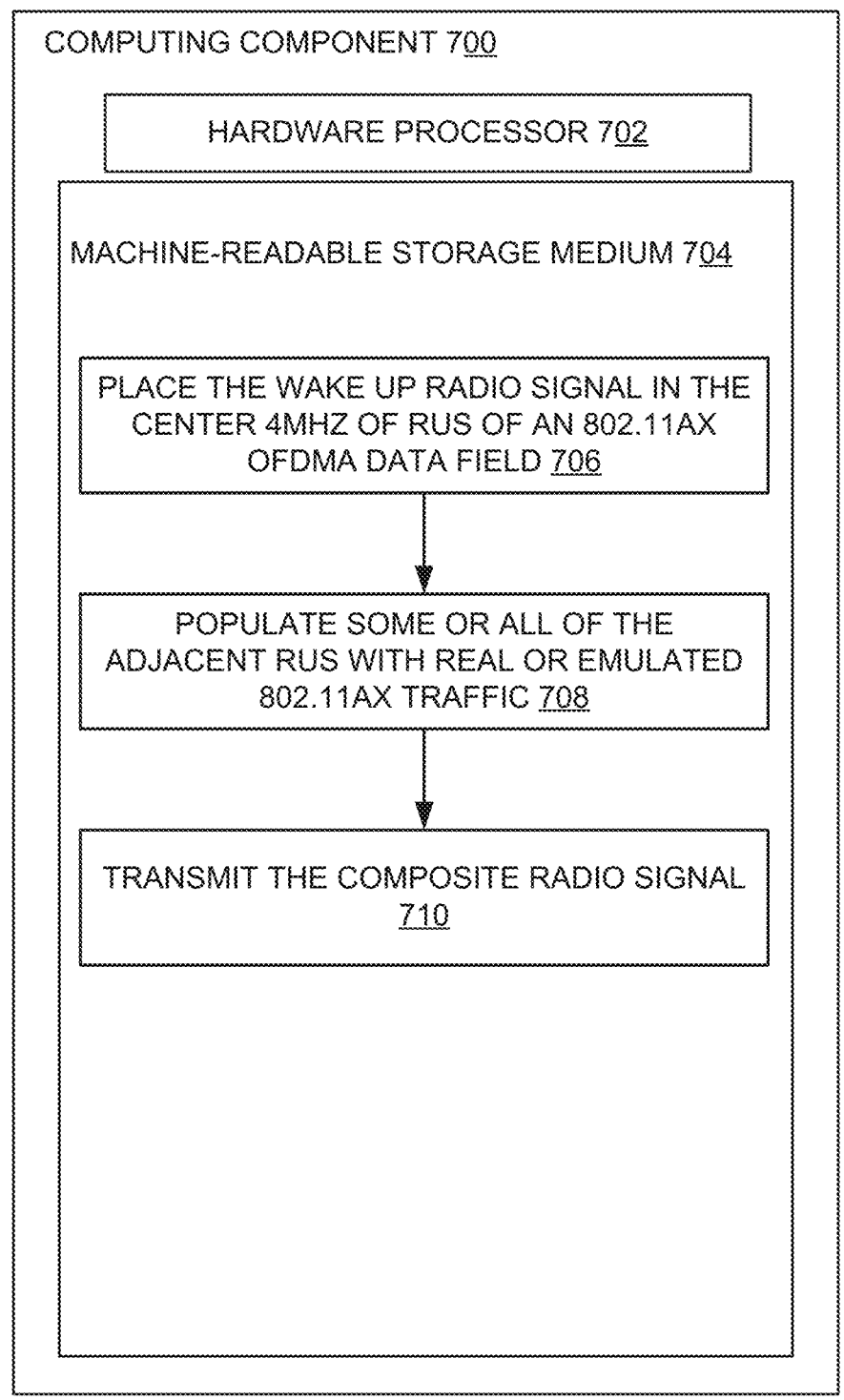
FIG. 7 is a block diagram of an example computing component or device for generating a composite radio signal in accordance with one embodiment.

FIG. 7 is a block diagram of an example computing component or device 700 for generating a composite radio signal in accordance with one embodiment. Computing component 700 may be, for example, a server computer, a controller, or any other similar computing component capable of processing data. In the example implementation of FIG. 7, the computing component 700 includes a hardware processor, 702, and machine-readable storage medium, 704. In some embodiments, computing component 700 may be an embodiment of an AP or AP controller, e.g., AP 302, respectively, or a component of network 120 of FIG. 1, for example. More particularly, computing component 700 may be a component of a central entity such as wireless mobility controller in the network.

Hardware processor 702 may be one or more central processing units (CPUs), semiconductor-based microprocessors, and/or other hardware devices suitable for retrieval and execution of instructions stored in machine-readable storage medium, 704. Hardware processor 702 may fetch, decode, and execute instructions, such as instructions 706-710, to control processes or operations for generating and transmitting the composite radio signal 330. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 702 may be a non-transitory storage medium, where the term "non-transitory" does not encompass transitory propagating signals. As described in detail below, machine-readable storage medium 702 may be encoded with executable instructions, for example, instructions 706-710.

Hardware processor 702 may execute instruction 706 to place the wake up radio signal 502 in the center 4 MHz of RUs of an 802.11ax OFDMA data field. In the nine-user 20 MHz IEEE 802.11ax PPDU the wake up radio signal 502 occupies the center three of the five 26-tone RUs. In the five-user 20 MHz IEEE 802.11ax PPDU the wake up radio signal 502 occupies the center 26-tone RU and portions of the two center 52-tone RUs. As described above, a similar process may be used with PPDUs having other numbers of users.

Hardware processor 702 may execute instruction 708 to populate some or all of the adjacent RUs with real or emulated 802.11ax traffic. In 802.11 DFS channels this population is required by IEEE 802.11ax. In particular, the AP 302 generates a packet with the 802.11ax PPDU format. The PPDU preamble identifies the 802.11ax users that occupy RUs adjacent to the 802.11ba wake up radio signal 502. The signaling for the central RUs indicates that they are unoccupied. The AP 302 then populates the central RUs with the 802.11ba wake up radio signal 502. The resulting signal is the composite radio signal 330.

Hardware processor 702 may execute instruction 710 to transmit the composite radio signal 330 from the AP 302 in an 802.11 DFS channel. The composite radio signal 330 may be a unicast packet or a multicast frame. The WLAN transceiver 306 transmits the composite radio signal 330 from the AP antenna 310.

Figure 8A:
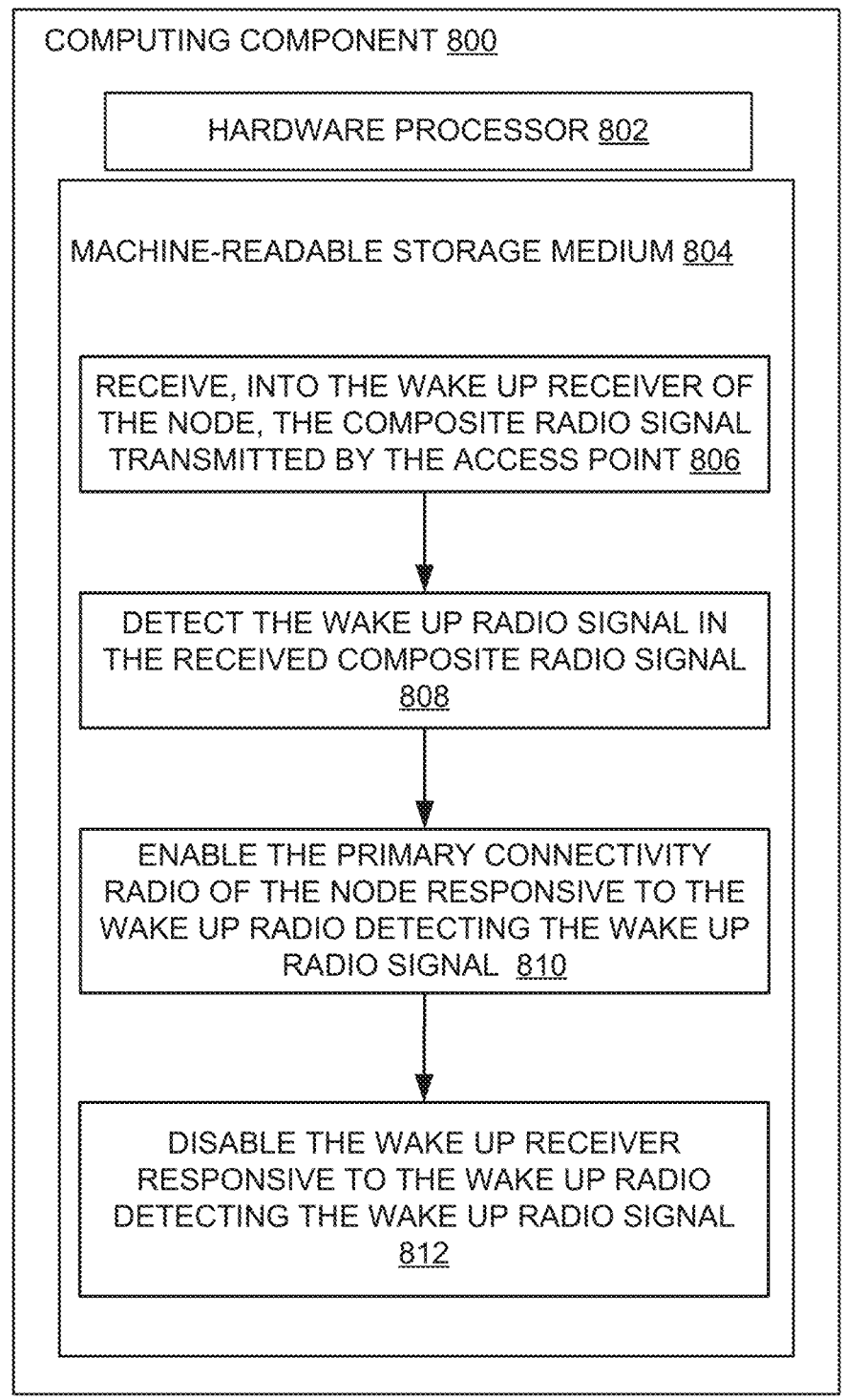
FIGS. 8A and 8B show a block diagram of an example computing component or device for generating a composite radio signal in accordance with one embodiment.
Figure 8B:
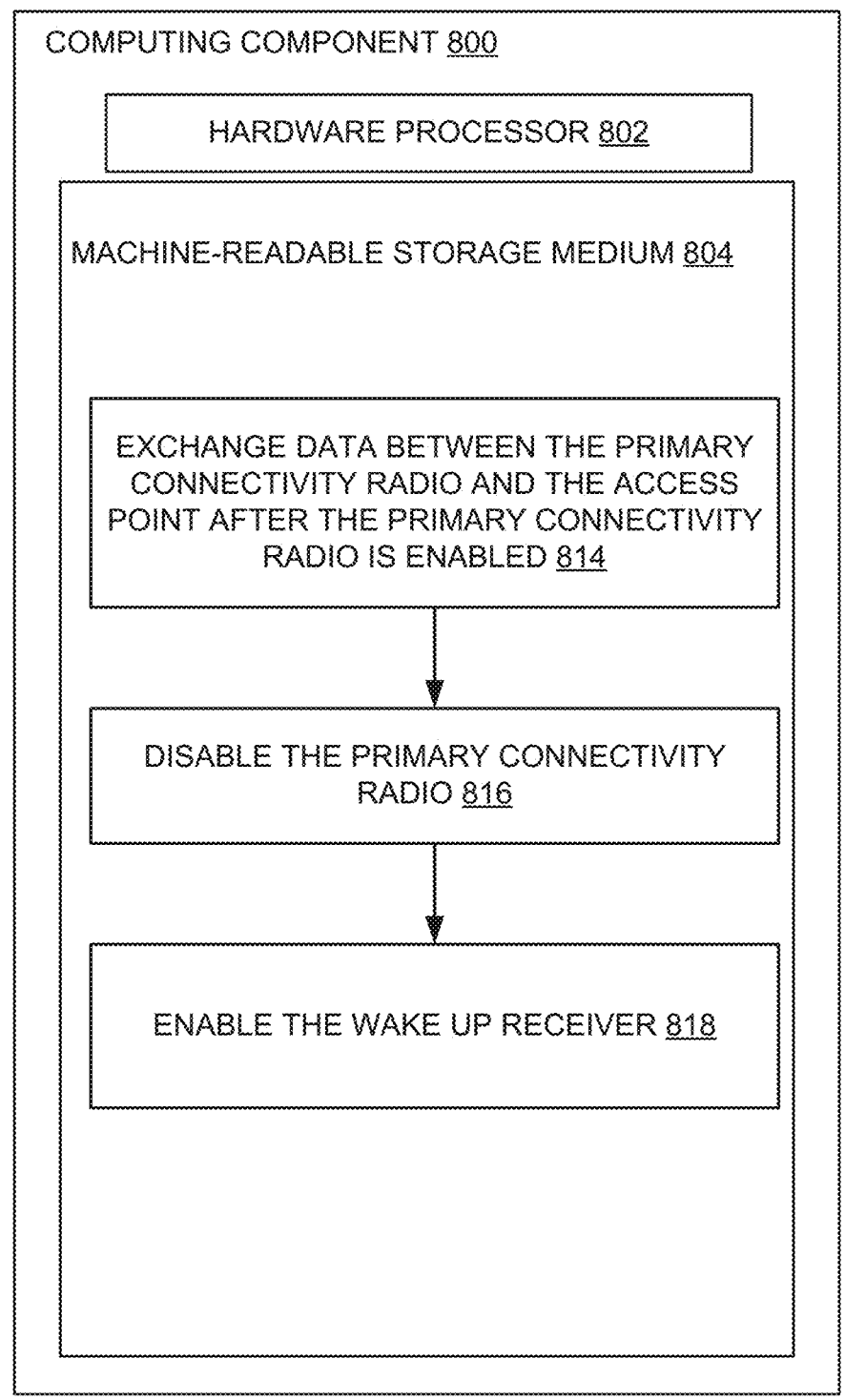

FIGS. 8A and 8B show a block diagram of an example computing component or device 800 for generating a composite radio signal in accordance with one embodiment. Computing component 800 may be, for example, a server computer, a controller, or any other similar computing component capable of processing data. In the example implementation of FIGS. 8A and 8B, the computing component 800 includes a hardware processor, 802, and machine-readable storage medium, 804. In some embodiments, computing component 800 may be an embodiment of a node or node controller, e.g., node 304, respectively, or a component of network 120 of FIG. 1, for example.

Hardware processor 802 may be one or more central processing units (CPUs), semiconductor-based microprocessors, and/or other hardware devices suitable for retrieval and execution of instructions stored in machine-readable storage medium, 804. Hardware processor 802 may fetch, decode, and execute instructions, such as instructions 806-818, to control processes or operations for receiving and processing the composite radio signal 330. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 802 may be a non-transitory storage medium, where the term "non-transitory" does not encompass transitory propagating signals. As described in detail below, machine-readable storage medium 802 may be encoded with executable instructions, for example, instructions 806-818.

Hardware processor 802 may execute instruction 806 to receive, into the wake up radio 314 of the node 304, the composite radio signal 330 transmitted by the AP 302 in an 802.11 DFS channel. The composite radio signal 330 includes a wake up radio signal 502 and a substantially adjacent, but not necessarily contiguous, time-continuous signal, for example as shown in FIG. 6. The wake up radio signal 502 may be received as an IEEE 802.11ba signal disposed in a center 4 MHz frequency band of a IEEE 802.11ax Physical Layer Convergence Protocol (PLCP) Protocol Data Unit (PPDU). The time-continuous signal may be received as real or emulated data traffic disposed in at least one IEEE 802.11ax resource unit, the at least one IEEE 802.11ax resource unit being substantially adjacent, but not necessarily contiguous, to the center frequency band of the IEEE 802.11ax PPDU.

Hardware processor 802 may execute instruction 808 to detect the wake up radio signal 502 in the received composite radio signal 330. The wake up radio signal 502 is detected by the wake up radio 314 after being received as part of the composite radio signal 330 on antenna 320.

Hardware processor 802 may execute instruction 810 to enable the primary connectivity radio 316 of the node 304 responsive to the wake up radio 314 detecting the wake up radio signal 502. For example, the wake up radio 314 may transmit a wake up trigger signal 326 to the primary connectivity radio 316, and the primary connectivity radio 316 may enable itself responsive to receiving the wake up trigger signal 326.

Hardware processor 802 may execute instruction 812 to disable the wake up radio 314 responsive to the wake up radio 314 detecting the wake up radio signal 502. In such embodiments the wake up radio 314 is disabled when the primary connectivity radio 316 is enabled. In other embodiments the wake up radio 314 may remain enabled.

Hardware processor 802 may execute instruction 814 to exchange data between the primary connectivity radio 316 and the access point 302 after the primary connectivity radio 316 is enabled. The data exchanged can be any sort of data, for example such as routine communications between an access point an a client device.

Hardware processor 802 may execute instruction 816 to disable the primary connectivity radio 316 after exchanging data between the primary connectivity radio 316 and the access point 302. When the primary connectivity radio 316 is disabled, the power consumed by the node 304 is greatly reduced. In battery-powered nodes, battery lifetime is thereby significantly extended.

Hardware processor 802 may execute instruction 818 to enable the wake up radio 314 after exchanging data between the primary connectivity radio 316 and the access point 302. With the wake up radio 314 listening for wake up radio signals 502, the primary connectivity radio 316 may remain disabled until another wake up radio signal 502 is received.

Figure 9:
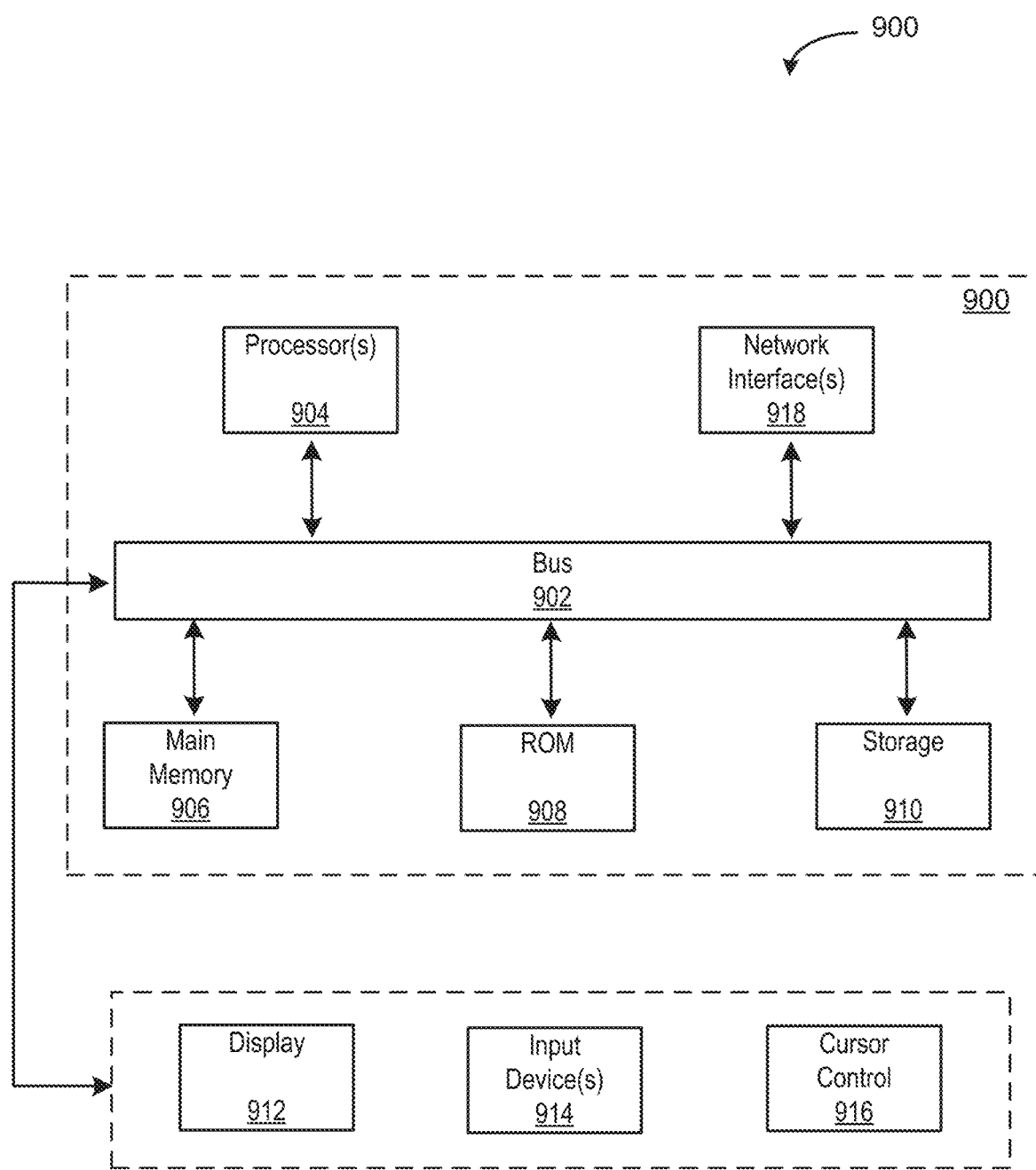
FIG. 9 depicts a block diagram of an example computer system in which various of the embodiments described herein may be implemented.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes a communication interface 918 coupled to bus 902. Network interface 918 provides a two-way data communication coupling to one or more network links that are connected to one or more local networks. For example, communication interface 918 may be an integrated services digital network (ISDN) card, cable modem, satellite modem, or a modem to provide a data communication connection to a corresponding type of telephone line. As another example, network interface 918 may be a local area network (LAN) card to provide a data communication connection to a compatible LAN (or WAN component to communicated with a WAN). Wireless links may also be implemented. In any such implementation, network interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 918, which carry the digital data to and from computer system 900, are example forms of transmission media.

The computer system 900 can send messages and receive data, including program code, through the network(s), network link and communication interface 918. In the Internet example, a server might transmit a requested code for an application program through the Internet, the ISP, the local network and the communication interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage medium encoded with instructions executable by a hardware processor of a computing component of a device, the machine-readable storage medium comprising instructions to cause the hardware processor to:
   transition the device to a sleep state, wherein a primary connectivity radio of the device is disabled and a wake up radio of the device is enabled, the wake up radio to monitor for receipt of a wake up signal;
   detect by the wake up radio of the device a composite radio signal received from an access point in an available IEEE 802.11 Dynamic Frequency Selection (DFS) channel, the composite radio signal comprising both a wake up radio signal received on a first frequency band of the DFS channel and a second signal received on a second, different frequency band at a same time, the second frequency band being substantially adjacent in frequency to, but not necessarily contiguous in frequency with, the first frequency band, and the second signal being a continuous signal over time;
   enable the primary connectivity radio in response to receipt of the composite signal; and
   exchange data with the access point through the primary connectivity radio after the primary connectivity radio is enabled.

2. The non-transitory machine-readable storage medium of claim 1, the instructions further causing the hardware processor to:
   disable the wake up radio responsive to receiving the composite radio signal.

3. The non-transitory machine-readable storage medium of claim 1, the instructions further causing the hardware processor to:
   disable the wake up radio after enabling the primary connectivity radio.

4. The non-transitory machine-readable storage medium of claim 1, the instructions further causing the hardware processor to:
   after exchanging data with the access point, (i) disable the primary connectivity radio, and (ii) enable the wake up radio.

5. The non-transitory machine-readable storage medium of claim 1, wherein:
   the wake up radio signal is wake up signal for an operation under the IEEE 802.11ba standard;
   the wake up signal is disposed in a center frequency band of the DFS channel; and
   the second signal is disposed in at least one resource unit, the at least one resource unit being substantially adjacent in frequency to, but not necessarily contiguous in frequency with, the center frequency band of the DFS channel.

6. A method comprising:
   transitioning a device to a sleep state, wherein a primary connectivity radio of the device is disabled and a wake up radio of the device is enabled, the wake up radio to monitor for receipt of a wake up signal;
   detecting by the wake up radio of the device a composite radio signal transmitted by an access point in an available IEEE 802.11 Dynamic Frequency Selection (DFS) channel, the composite radio signal comprising both a wake up radio signal transmitted on a first frequency band of the DFS channel and a second signal transmitted on a second, different frequency band the second frequency band being substantially adjacent in frequency to, but not necessarily contiguous in frequency with, the first frequency band, and the second signal being a continuous signal over time; and responsive to receiving the composite radio signal, (i) enabling a primary connectivity radio of the device, and (ii) exchanging data between the primary connectivity radio and the access point.

7. The method of claim 6, further comprising:
disabling the wake up radio responsive to receiving the composite radio signal.

8. The method of claim 6, wherein enabling the primary connectivity radio of the device comprises:
detecting the wake up radio signal of the composite radio signal;
responsive to detecting the wake up radio signal, sending a wake up trigger signal to the primary connectivity radio; and
responsive to the primary connectivity radio receiving the wake up trigger signal, enabling the primary connectivity radio.

9. The method of claim 8, further comprising:
disabling the wake up radio after the wake up radio sends the wake up trigger signal to the primary connectivity radio.

10. The method of claim 6, further comprising:
after exchanging data between the primary connectivity radio and the access point, transitioning the device to the sleep state, including (i) disabling the primary connectivity radio, and (ii) enabling the wake up radio.

11. The method of claim 6, wherein receiving the composite radio signal comprises:
receiving the wake up radio signal in a center frequency band of the DFS channel; and
receiving the second signal disposed in at least one resource unit, the at least one resource unit being substantially adjacent in frequency to, but not necessarily contiguous in frequency with, the center frequency band of the DFS channel.

12. An apparatus comprising:
a primary connectivity radio configured to exchange data with an access point when the primary connectivity radio is enabled; and
a wake up radio configured to monitor for receipt of wake up signal during a sleep state in which the primary connectivity radio of the apparatus is disabled and the wake up radio of the apparatus is enabled;

wherein the apparatus is to:
enable the primary connectivity radio responsive to the wake up radio detecting a composite radio signal transmitted by an access point in an available IEEE 802.11 Dynamic Frequency Selection (DFS) channel, the composite radio signal comprising both a wake up radio signal received on a first frequency band of the DFS channel and a second signal received on a second, different frequency band of the DS channel, the second frequency band being substantially adjacent in frequency t, but not necessarily contiguous in frequency with, the first frequency band, and the second signal being a continuous signal over time; and
exchange data with the access point through the primary connectivity radio after the primary connectivity radio is enabled.

13. The apparatus of claim 12, wherein:
the wake up radio is further configured to detect the wake up radio signal of the composite radio signal and, responsive to detecting the wake up radio signal, send a wake up trigger signal to the primary connectivity radio; and
the primary connectivity radio is further configured to enable itself responsive to receiving the wake up trigger signal.

14. The apparatus of claim 13, wherein:
the wake up radio is further configured to disable itself after sending the wake up trigger signal to the primary connectivity radio.

15. The apparatus of claim 12, wherein:
the primary connectivity radio is further configured to disable itself after exchanging data with the access point.

16. The apparatus of claim 12, further comprising:
the primary connectivity radio is further configured to enable the wake up radio after exchanging data with the access point.

17. The apparatus of claim 12, wherein:
the wake up radio signal is in a center frequency band of the DFS channel; and
the second signal is disposed in at least one resource unit, the at least one resource unit being substantially adjacent in frequency to, but not necessarily contiguous in frequency with, the center frequency band of the DFS channel.

* * * * *